United States Patent
Bobier

(10) Patent No.: US 7,804,913 B2
(45) Date of Patent: Sep. 28, 2010

(54) INTEGER CYCLE FREQUENCY HOPPING MODULATION FOR THE RADIO FREQUENCY TRANSMISSION OF HIGH SPEED DATA

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 250 days.

(21) Appl. No.: 11/973,521

(22) Filed: Dec. 3, 2007

(65) Prior Publication Data

US 2009/0245328 A1    Oct. 1, 2009

(51) Int. Cl.
*H04L 27/04*   (2006.01)
*H04L 27/06*   (2006.01)

(52) U.S. Cl. .................................. 375/295; 375/316
(58) Field of Classification Search .............. 375/295, 375/316
See application file for complete search history.

(56) References Cited

U.S. PATENT DOCUMENTS

| | | | | | |
|---|---|---|---|---|---|
| 2,677,015 | A | * | 4/1954 | Hausman | 178/69 M |
| 3,499,995 | A | * | 3/1970 | Clark | 370/204 |
| 3,518,552 | A | * | 6/1970 | Carlow | 377/80 |
| 3,555,428 | A | * | 1/1971 | Perreault | 375/328 |
| 3,803,354 | A | * | 4/1974 | Bennett | 375/272 |
| 5,789,991 | A | * | 8/1998 | Ishii | 332/100 |
| 6,240,073 | B1 | * | 5/2001 | Reichman et al. | 370/319 |
| 2002/0058484 | A1 | * | 5/2002 | Bobier et al. | 455/108 |
| 2002/0196865 | A1 | * | 12/2002 | Soh | 375/303 |

* cited by examiner

*Primary Examiner*—Tesfaldet Bocure
(74) *Attorney, Agent, or Firm*—Dennis L. Cook, Esq.

(57) ABSTRACT

The invention disclosed in this application uses a method of modulation named Integer Cycle Frequency Hopping (ICFH) wherein a carrier signal, comprised of a continuum of sine waves is generated on a single frequency. A data bit representing either a "1" or a "0", depending upon the logic polarity chosen by the builder is imposed upon the carrier signal by modifying the carrier signal at precisely the zero crossing point or the zero degree angle. The method of imposing the data is to cause either a lengthening or shortening of the proceeding 360 degrees of phase angle, thus effectively either raising or lowering the frequency of the carrier signal for just the one, or a succession of cycles at hand. Upon completion of the 360-degree cycle(s), the carrier will return to the original frequency. The main carrier frequency is only modulated beginning at the zero degree phase angle and ending at the 360-degree phase angle. In this modulation scheme as few as one sine wave cycle can be used to represent one data bit. The spectral output of a transmitting device using this modulation scheme will be defined by the difference in frequency between the main carrier signal and the modulating frequency. In the resulting signal a modulated segment of the main carrier frequency can represent either a binary "1" or a binary "0".

17 Claims, 2 Drawing Sheets

FIGURE 2
RECEIVER / DEMODULATOR
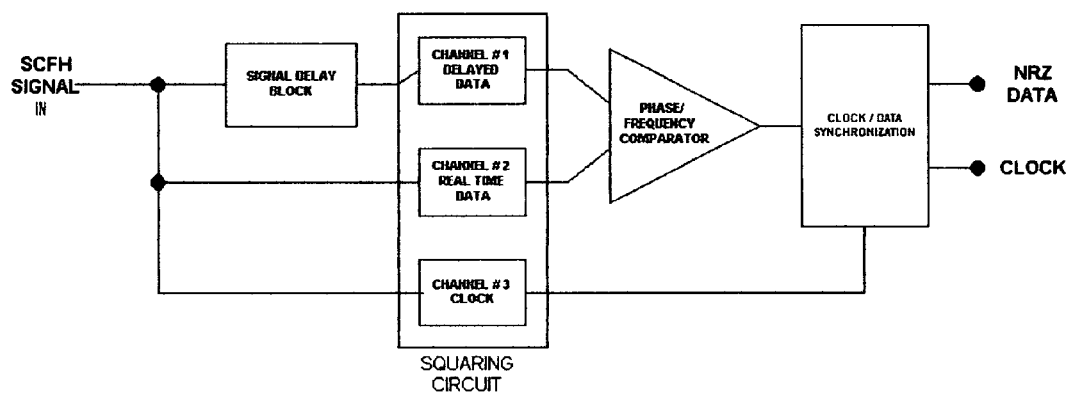
SCFH TRANSMITTER
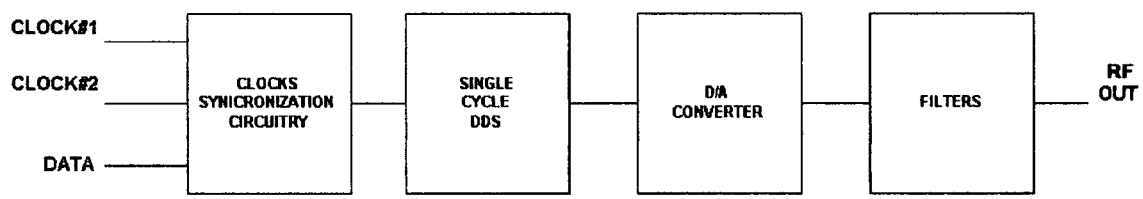
FIGURE 3

INTEGER CYCLE FREQUENCY HOPPING MODULATION FOR THE RADIO FREQUENCY TRANSMISSION OF HIGH SPEED DATA

CROSS-REFERENCE TO RELATED APPLICATIONS

The present application claims the benefit of previously filed co-pending patent applications, Ser. Nos. 60/442,716 and 10/765,442, now abandoned on Dec. 31, 2007.

FIELD OF THE INVENTION

This invention addresses the need to transport high bit-rate data over wired or wireless means using specially modulated radio frequency carrier waves. Specifically, the invention provides a modulated signal and method of modulation by which the spectral channel width occupied by the radio signal can remain very narrow even though the data bit-rate, which is used as the modulating signal, may be very fast, including data bit rate speeds up to and equal to the frequency of the carrier itself.

BACKGROUND OF THE INVENTION

Radio transmission of information traditionally involves employing electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes that can be detected at a receiving point or station. The changes imposed correspond with the information to be transmitted, and are known in the art as "modulation".

Where the amplitude of the carrier is changed in accordance with information to be conveyed, the carrier is said to be amplitude modulated (AM). Similarly, where the frequency of the carrier is changed in accordance with information to be conveyed, either rarified or compressed wave cycles are developed, and the carrier is said to be frequency modulated (FM), or in some applications, it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of one or more. All such forms of modulation have inherent inefficiencies. For instance, a one KHz audio AM modulation of a Radio Frequency (RF) carrier operating at one MHz will have a carrier utilization ratio of only 1:1000. A similar carrier utilization occurs with corresponding FM modulation. Also, for all forms of currently employed carrier modulation, frequencies higher and lower than the frequency of the RF carrier are produced. Since they are distributed over a finite portion of the spectrum on each side of the carrier frequency, they are called side frequencies and are referred to collectively as sidebands. These sidebands contain all the message information and it has been considered that without them, no message can be transmitted. Sidebands, in effect, represent a distribution of power or energy from the carrier and their necessary development has lead to the allocation of frequencies in terms of bandwidths by governmental entities in allocating user permits within the radio spectrum. This necessarily limits the number of potential users for a given RF range of the spectrum.

To solve the bandwidth crisis in the RF Spectrum, multiple access systems were developed. Multiple Access Systems are useful when more than one user tries to transmit information over the same medium. The use of multiple access systems is more pronounced in Cellular telephony; however, they are also used in data transmission and TV transmission. There are three common multiple access systems. They are:
1. Frequency Division Multiple Access (FDMA)
2. Time Division Multiple Access (TDMA)
3. Code Division Multiple Access (CDMA)

FDMA is used for standard analog cellular systems. Each user is assigned a discrete slice of the RF spectrum. FDMA permits only one user per channel since it allows the user to use the channel 100% of the time. FDMA is used in the current Analog Mobile Phone System (AMPS).

In a TDMA system the users are still assigned a discrete slice of RF spectrum, but multiple users now share that RF carrier on a time slot basis. A user is assigned a particular time slot in a carrier and can only send or receive information at those times. This is true whether or not the other time slots are being used. Information flow is not continuous for any user, but rather is sent and received in "bursts". The bursts are re-assembled to provide continuous information. Because the process is fast, TDMA is used in IS-54 Digital Cellular Standard and in Global Satellite Mobile Communication (GSM) in Europe. In large systems, the assignments to the time/frequency slots cannot be unique. Slots must be reused to cover large service areas.

CDMA is the basis of the IS-95 digital cellular standard. CDMA does not break up the signal into time or frequency slots. Each user in CDMA is assigned a Pseudo-Noise (PN) code to modulate transmitted data. The PN code is a long random string of ones and zeros. Because the codes are nearly random there is very little correlation between different codes. The distinct codes can be transmitted over the same time and same frequencies, and signals can be decoded at the receiver by correlating the received signal with each PN code.

The great attraction of CDMA technology from the beginning has been the promise of extraordinary capacity increases over narrowband multiple access wireless technology. The problem with CDMA is that the power that the mobiles are required to transmit goes to infinity as the capacity peak is reached. i.e. the mobiles will be asked to transmit more than their capacity allows. The practical consequence of this is that the system load should really be controlled so that the planned service area never experiences coverage failure because of this phenomenon. Thus CDMA is a tradeoff between maximum capacity and maximum coverage.

Over the previous few decades, electronically derived information has taken the form of binary formatted data streams. These data streams are, for the most part, transmitted through telecommunication systems, i.e., wire. Binary industry communication in general commenced with the networking of computer facilities in the mid 1960s. An early networking architecture was referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Next, Local Area Networks (LAN) proliferated during the 1970s, the oldest and most prominent, Ethernet, having been developed by Metcalfe in 1973. Under the Ethernet concept, each station of a local system connects by cable to a transceiver and these transceivers are then inter-linked. In 1983, the Institute of Electrical and Electronic Engineers (IEEE) promulgated Ethernet with some modifications, as the first standard protocol for Local Area Networks. The Ethernet protocol remains a standard for essentially all forms of database conveyance or exchange.

It is well known by those skilled in the art that a radio signal consists of at least one electromagnetic energy packet. These packets are comprised of both an electrical field and a magnetic field traveling through space. The mathematical description of each field is that of a sinusoidal shape, with each field conjoined in a transverse relationship, mutually dependant upon one another as shown in FIG. 1.

In the traditional usage, when these packets (photons) are generated together into a continuum of sequential sine waves, we have what is referred to as a radio carrier, which, if constituted of identical packets, is said to be un-modulated. For the radio spectrum to be pure, which consists of only one single and narrow radio channel when plotted on a spectral diagram, the packets are conjoined temporally so that as the phase angle of a preceding packet crosses the zero-degree end point, the proceeding packet is just beginning at the zero-degree angle. Thus from the perspective of the observer, a continuous 360 degree undulation of both electrical and magnetic fields would be observed.

Any radio system in use today will modify large groups of these conjoined packets in one or more ways to convey information. For example, a modern wireless phone might transmit near a frequency of 1.9 GHz and modulate the carrier at a rate of about 6 KHz to achieve a data throughput of 14.4 kbps. In this example, a portion of the carrier, consisting of about 316,366 individual sine waves is modified as a group to represent a single binary bit.

To represent the simplest form of communication, the binary system, there are several ways to alter at least one of the following four characteristics of the continuum of sine wave packets (referred to herein as sine waves) to indicate to the receiving mechanism that a binary one or zero is conveyed.

Sine waves can be modified in at least the following four basic ways:
1. Amplitude: The amplitude of the electrical and magnetic fields can be increased or decreased to cause either a larger or smaller signal to be detected at the receiving device. The change in amplitude can represent the conveyance of a binary one or a binary zero or even a change in binary state when the previous state is already known.
2. Frequency: The period of the individual sine waves within a group can be increased or decreased to make the same representation as in example one above. This is also called frequency modulation.
3. Interruption: The continuum of sine waves can be interrupted, then re-established to indicate a zero or one condition, or as in example one and two above, the interruption could represent a change in logic state assuming the previous state was known. This is sometimes known as CW or Pulse code modulation.
4. Phase: The phase of a group of sine waves could be altered so that the sine waves are in fact not sine waves any more. They now consist of an amalgamation of two or more frequencies, whose presence indicates the conditional change in logic state.

Many modulation techniques now exist that use any of the above methods either singularly or in combination. Lately a mixing of these methods has been in popular use because by modifying more than one characteristic, more than one single logic state can be represented. For instance the Quadrature Amplitude Modulation system (QAM) can combine the use of both amplitude and frequency modulation to represent multiple binary combinations.

Even though binary data stream transmission by wire has improved substantially in terms of data transfer rates, that improvement has not been the case where transmission is by utilization of the RF spectrum. Current technology in data stream transmission by wire is shown in U.S. Pat. No. 5,661,373 titled Binary digital signal transmission system using binary digital signal of electrically discharged pulse and method for transmitting binary digital signal and issued Aug. 26, 1997 to Nishizawa, which discloses a binary digital signal transmission system wherein a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

As discussed above it is well recognized by those skilled in the art that in modern radio communications a troubling problem exists in the utilization of spectrum. Many radio communication services exist to support the market needs of many diverse users. Government agencies regulate the usage of radio spectrum among such diverse users as government, military, private business, radio common carriers (RCC) and unlicensed individual users. The need for radio spectrum is an immense problem. The problem is compounded because modern radio systems transport binary digital information using modulation methods that are merely adaptations of methods that were originally designed for conveyance of analog information. Namely, voice, music and video transmissions, which were the sole forms of information in the 20th century, are now quickly being replaced with digital representations of the same. Added to this is the need to allow the user to access digital information from the Internet, corporate databases and other sources. Truly this is a modern problem. Since the means of modulating the radio carrier are still the same as those used in the past the amount of spectral width required by individual transmitters is ever increasing. Well-known theories of modulation define these modulation systems and dictate that as the amount of information increases in a given modulated stream, the number of spectral byproducts, called sidebands will increase. For instance, using common methods of radio modulation, a typical channel width for a digital transmission will be about ½ of the rate of binary state change. Applied in real terms, a radio transmitter that is conveying information at a rate of 100 kilobits per second (KBPS) will require a clear section of radio spectrum of about 50 KHz of width, with the carrier at the center of the channel. In this age, 100 KBPS is a low rate of data transmission, so in practice many services are requiring huge allocations of the limited spectrum resource.

A solution is required that will allow the maximum amount of information to be conveyed, while consuming the least amount of spectral width.

Integer Cycle Frequency Hopping (ICFH), or alternatively known as Single Cycle Frequency Hopping (SCFH), is designed to help alleviate this massive and growing problem. Its signal characteristics break the connection between the rate of data transmission and the width of the radio channel. In fact, ICFH makes a new connection between the frequency of the radio transmission and the rate of data conveyance.

BRIEF SUMMARY OF THE INVENTION

The invention disclosed in this application uses a method of modulation named Integer Cycle Frequency Hopping (ICFH). A description of the technique follows:
1. A carrier signal, comprised of a continuum of sine waves is generated on a single frequency.
2. A data bit representing either a "1" or a "0", depending upon the logic polarity chosen by the builder is imposed upon the carrier signal by modifying the carrier signal at precisely the zero crossing point or the zero degree angle. The method of imposing the data is to cause either a lengthening or shortening of the proceeding 360 degrees of phase angle, thus effectively either raising or lowering the frequency of the carrier signal for just the one cycle, or an integer number of cycles, at hand.
3. Upon completion of the single or integer number of 360-degree cycles, the carrier will return to the original frequency.

The following parameters define this invention:

The main carrier frequency is only modulated beginning at the zero degree phase angle and ending at the integer number times 360-degree phase angle.

As few as one sine wave cycle can be used to represent one data bit.

The spectral output of a transmitting device using this modulation scheme will be defined by the difference in frequency between the main carrier signal and the modulating frequency resulting in a spectral output of multiple frequencies spread over a broad spectral band when the alteration of the 360 degree cycle occurs.

A modulated segment of the main carrier frequency can represent either a binary "1" or a binary "0".

The invention accordingly, comprises the RF signal and the methods possessing the steps of modulation, transmission, and reception, which are exemplified in the following detailed description.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the following detailed description, taken in connection with the accompanying drawings, in which:

FIG. 2 is a block schematic diagram of a SCFH receiver.

FIG. 3 is a block schematic diagram of a SCFH transmitter.

DETAILED DESCRIPTION OF THE INVENTION

Figure 1:
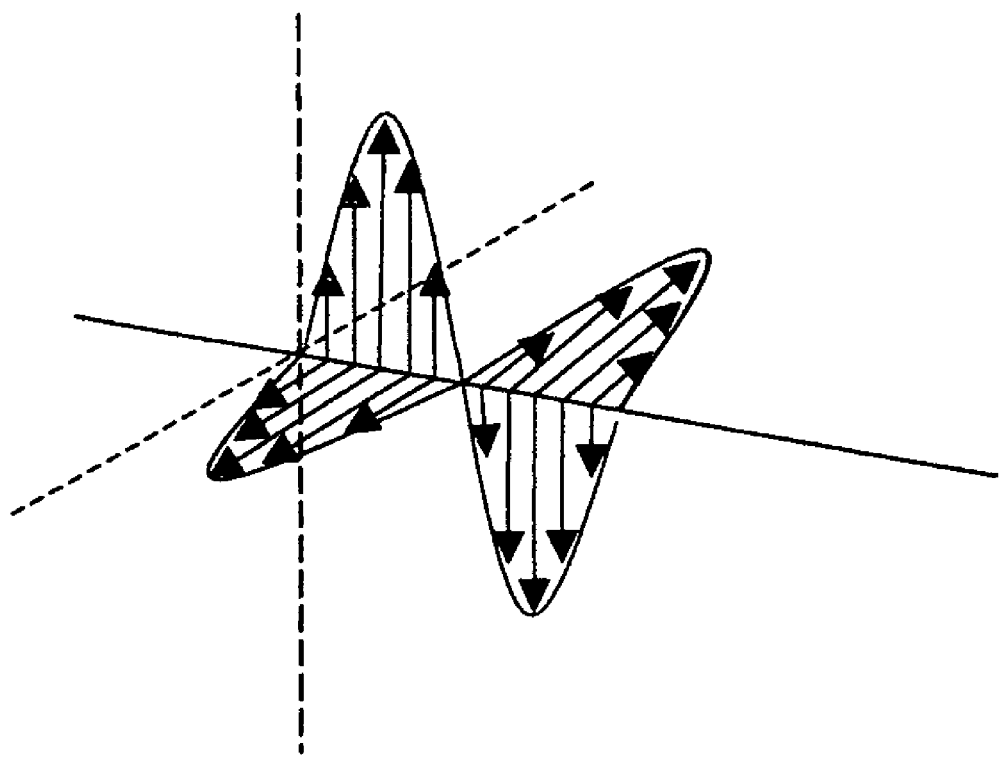
FIG. 1 is a representation of a single packet of electromagnetic energy.

In patent application Ser. No. 09/511,470 filed by Joseph Bobier (a co-inventor of this patent application), the contents of which are incorporated herein, a new method of carrier modulation referred to as "missing cycle modulation" (MCM) was disclosed. That method of modulation uses an RF carrier comprised of a continuum of full cycle sinusoidal wavelets extending between zero crossover points or positions, and that carrier is then modulated to carry binary information by selectively deleting one or a succession of carrier wavelets. Such a deletion may be assigned to represent either a binary one or zero value. The deletional modulation is carried out by the removal, by switching, of data related wavelets at the sinusoidal zero crossing positions defining them.

Inasmuch as these zero positions correspond with the absence of electro-magnetic wave energy, no wave disturbances are invoked which, would in turn, produce side frequencies. As a consequence, the assigned carrier frequencies may be quite close together in value to provide a substantially improved utilization of the radio spectrum for binary data transmittal.

In a related patent application Ser. No. 09/916,054 also filed by Joseph Bobier (a co-inventor of this patent application), the contents of which are incorporated herein, the deletional modulation of the original invention was modified to merely suppress the amplitude of the cycle resulting in suppressed cycle modulation (SCM). This type of modulation is accomplished when the carrier is amplitude modulated with a modulation signal that is equal in frequency to the carrier itself and the modulation always begins or ends upon the exact zero voltage crossing point of the RF cycle phase. The modulation is applied as a shift of the amplitude of any single cycle or succession of cycles, each such cycle or succession of cycles representing a single bit of data. In SCM, each individual RF cycle, or succession of cycles, represents one bit of data. A single cycle of RF, or succession of RF cycles, will either represent a "1" or "0" depending upon the amplitude of the cycle(s), relative to other adjacent cycles in the same carrier. It is necessary to visualize the carrier as a bit stream, rather than a carrier. The relative amplitude of one bit to another will determine the logical state. For instance, a cycle which is relatively higher in amplitude than other cycles in the stream might be considered to represent a "1". Conversely, a cycle that is relatively lower in amplitude than other cycles in the bit stream might be considered to represent a "0".

The Integer Cycle Frequency Hopping (ICFH) modulation of this invention a unique method of radio frequency modulation. The purpose of the method is to cause a radio frequency carrier to convey information in a manner that will utilize the minimum radio spectrum bandwidth while simultaneously conveying information at the highest possible rate.

As described previously, ICFH is based upon the premise that individual photons, when used in the portion of the electromagnet spectrum referred to as radio, can be emitted and detected individually, and that these individual emanations can be used to represent individual messages in the form of binary numbers.

It was in the Nobel Prize winning disclosure by Albert Einstein that it was taught that photons of light, now understood to encompass all electromagnetic radiation, are self-contained packets of energy. Each photon can act as both a particle or a wave, depending upon the relative position of the observer. Each photon is a self-contained unit, requiring no other photons to exist. In this disclosure the terms "sinewave" and "packet" are used interchangeably. Thus we can extrapolate that just as photons of light can be emitted and detected individually and in isolation, photons of longer period, what we refer to as radio waves, can be likewise utilized. ICFH uses this concept to reduce the number of photons use in radio communication to as few as an individual photon. ICFH relies upon the single sine wave (or packet) to represent the most basic of information, the binary digit. In the simplest form, an ICFH transmitter will emit one single sine wave to represent one single binary event. In one embodiment, single emissions of sine waves of a given radio frequency represent one binary state, while single emissions of sine waves of another radio frequency are emitted to represent the alternative binary state. Therefore it can be said that the purest and simplest natural form of electromagnetic radiation, the single sine wave of radio energy, represents the simplest form of information conveyance, the binary digit.

ICFH embodies the following minimum set of characteristics to convey information while consuming the least amount of spectral channel width.

1. A transmitter on an individual basis, each single sine wave representing a binary bit, emits sine waves.
2. Sine waves of a different period (frequency) are emitted individually to represent the alternative binary logic state.
3. Each emitted sine wave is complete, undistorted in phase, amplitude or any other imperfection.
4. Regardless of frequency or logic representation, each sine wave is preceded and proceeded by another sine wave and the individual sine waves are conjoined so that there is no lapse of time or phase degree angle.
5. All sine waves are substantially equal in amplitude.

Thus a radio transmission from a ICFH transmitter will contain very few harmonic components, because there is little disturbance to the continuum of sine waves as seen by an observer. Since under an ICFH rule set, each sine wave could represent one bit of information, the rate of information conveyance can be equal to the frequency of the radio signal.

In practical uses, the signal consists of at least two radio frequencies, separated by some spectral distance. Thus, we have a continuum of sine waves, some having a period equating to frequency "A" and some having a period equating to frequency "B". These sine waves of disparate frequency are joined at the beginning or ending zero degree phase angles and form a continuous carrier of steady amplitude. In actual embodiments, this carrier must be decoded so that sine waves are recognized for the individual frequencies of which they are formed. It is the purpose of the demodulator in the receiver to do this and from the period of each sine wave determine the assigned representation of the sine wave as a binary one or zero.

Referring now to FIG. 2 the reader can see how the modulation system is implemented in an embodiment of a receiver. The received signal is fed to three points: The first path is through the delay line. This creates a one wavelength delay of the received signal. The second path is directly to the frequency/phase detector. The third is to a squaring amp. The detector compares the present wavelet to the preceding wavelet and outputs a pulse if there is a difference in phase/frequency. A difference will result in a pulse sent to the clock/synchronization block, where it is time correlated to the clock, which is the RF carrier itself. Data is presented as NRZ data, in this implementation. If the carrier is un-modulated, there will be no difference between present and past cycles, thus no pulse. If a cycle of different frequency arrives, a difference will be detected at the detector, thus data is received.

Referring now to FIG. 3 the reader can see how the modulation system is implemented in an embodiment of a transmitter. Two clocks are presented to the clock synch circuit. Data is also presented to the same block. If no data is present, the Single Cycle DDS will produce un-modulated digital pulses to the D/A converter such that it outputs sine waves of consistent frequency. If data is present, the SCDDS will output digital pulses of a different overall period and the D/A converter will convert to sine waves of a different frequency. The SCDDS will output X number of samples, (8, 16, 32 etc. depending upon desired resolution) to the D/A converter. The digitally formed sine wave output of the D/A is filtered to remove higher frequency components and a pure sine wave is the result.

Thus, a system of radio modulation is disclosed that has the benefits of very minimal channel width requirements, no connection between information rate and the channel width and the ability to transport data at a rate commensurate with the radio frequency.

The spectral separation of the radio frequencies used will determine the spectral width of the channel overall resulting in a spectral output of multiple frequencies spread over a broad spectral band when the alteration of the 360 degree cycle occurs. This is antithetic to usual methods of modulation, which increase the channel width as a factor of the rate of data conveyance.

The inventors recognize that, given the disclosure of this application, numerous variations and embodiments of the receiver and transmitter described above could be designed by those skilled in the art and those variations and embodiments are considered within the scope of this invention. Also, the continuum of sine waves, in addition to being comprised of individual packets of two separate periods, could also consist of packets of multiple periods. For instance, a carrier that consists of packets of four different periods could a form a data compression system. This would allow for the actual rate of data conveyance to exceed the carrier frequency, while maintaining a minimal number of radio sidebands and virtually no increase in the width of the occupied radio spectrum.

Because of the above-mentioned inherent advantages, ICFH when used in conjunction with FDMA or TDMA also guarantees high-speed data transmission to multiple simultaneous users.

When used in FDMA mode, each user is assigned a particular carrier frequency to transmit/receive their information. Therefore, since the bandwidth requirement for a channel to transmit (or receive) high-speed data is low, hundreds or thousands of channels can be accommodated within a narrow spectral band. ICFH in FDMA mode allows the user to use the channel 100% of the time.

When used in TDMA mode, multiple users share the common frequency band and they are required to transmit their information at different time slots within the carrier. Data is transmitted and received in bursts. These bursts are reassembled at the receiver (or base station) to provide continuous information. Since the data transmission speed is the same as the carrier speed in ICFH, this process of transmitting/receiving bursts of data appears continuous.

Like CDMA, the ICFH method has negligible interference from adjacent channels. But CDMA performance decreases as the system approaches its capacity (i.e., as the number of users increase, each user must transmit more power). This creates a coverage problem for CDMA. Thus, CDMA requires a tradeoff between maximum capacity and maximum coverage. The ICFH system performance does not decrease with an increase in the number of users in a multiple access system. This is because when the ICFH system is used in FDMA mode, each user will have its own carrier, and when the ICFH system is used in TDMA mode, each user is allowed to transmit/receive in its particular time slot only. Thus capacity and coverage problems in ICFH are negligible.

Since certain changes may be made in the above described RF signal and method without departing from the scope of the invention herein involved, it is intended that all matter contained in the description thereof or shown in the accompanying drawings shall be interpreted as illustrative and not in a limiting sense.

What is claimed is:

1. A modulated radio frequency carrier capable of transmitting in an available channel a binary information stream made up of first and second binary states each having the same length comprising:

a carrier frequency waveform made up of a continuous sequence of complete discrete wavelets;

said complete discrete wavelets being defined by a 360 degree cycle between crossover positions;

said crossover positions representing a substantially zero energy level; and, said complete discrete wavelets having been modulated in accordance with said information stream by having altered the frequency to an alternative frequency determined by the spectral width of the available channel of a single or non-zero positive integer number of said complete discrete wavelets that correspond to said first binary states of said information stream and not having altered the frequency of a single or non-zero positive integer number of said complete discrete wavelets that correspond to said second binary states of said information stream where the change of frequency from said carrier frequency waveform to said altered frequency wavelets starts at the crossover positions representing a substantially zero energy level having zero degree phase angle and ends at the crossover positions representing a substantially zero energy level having 360 degree phase angle resulting in a spectral output of multiple frequencies spread over a broad spectral band defined by the difference in frequency between said carrier frequency waveform and said altered frequency wavelets during said altered 360 degree cycle.

2. The modulated radio frequency carrier of claim 1 wherein:

any harmonics of said modulated radio frequency carrier that were generated when said complete discrete wavelets were altered have been reduced by filtering.

3. A method for transmitting binary information from a binary information stream over a radio frequency carrier in an available channel comprising the steps of:

generating a radio frequency carrier at a select carrier frequency such that said radio frequency carrier has a waveform with a continuous sequence of complete discrete wavelets with similar amplitudes;

said complete discrete wavelets being defined by a 360 degree cycle between crossover positions of said radio frequency carrier waveform;

said crossover positions representing a substantially zero energy level;

receiving said information stream as a binary data sequence of first and second binary states each having the same length;

modulating said radio frequency carrier in accordance with said binary data sequence by altering the frequency to an alternative frequency determined by the spectral width of the available channel of a single or non-zero positive integer number of said complete discrete wavelets that correspond to said first binary states to derive first carrier binary signals and not altering the frequency of a single or non-zero positive integer number of said complete discrete wavelets that correspond to said second binary states of said information stream where the change of frequency from said carrier frequency waveform to said altered frequency wavelets starts at the crossover positions representing a substantially zero energy level having zero degree phase angle and ends at the crossover positions representing a substantially zero energy level having 360 degree phase angle resulting in a spectral output of multiple frequencies spread over a broad spectral band defined by the difference in frequency between said carrier frequency waveform and said altered frequency wavelets during said altered 360 degree cycle thereby generating an integer cycle modulated carrier made up of said first carrier binary signals and said second carrier binary signals; and, broadcasting said integer cycle modulated carrier such that a integer cycle modulated radio frequency signal is generated.

4. The method of claim 3 wherein:

the modulating of said radio frequency carrier is carried out by altering the frequency of a single or non-zero positive integer number of said complete discrete wavelets while minimizing sideband distortions of said radio frequency carrier.

5. The method of claim 3 wherein:

the generation of said radio frequency carrier is accomplished by a local oscillator having an oscillator output at a select carrier frequency.

6. The method of claim 3 comprising the additional step of:

reducing of harmonics from said integer cycle modulated carrier by filtering said integer cycle modulated carrier.

7. The method of claim 3 wherein:

broadcasting said integer cycle modulated carrier is accomplished using a Time Division Multiple Access system such that Time Division Multiple integer cycle modulated radio frequency signals are broadcasted.

8. The method of claim 3 wherein:

broadcasting said integer cycle modulated carrier is accomplished using a Frequency Division Multiple Access system such that Frequency Division Multiple integer cycle modulated radio frequency signals are broadcasted.

9. A method for receiving radio frequency transmitted binary information that was derived from a binary information stream composed of a binary data sequence of first and second binary states each having the same length said binary information stream having been modulated onto a radio frequency carrier in an available channel which has a waveform with a continuous sequence of complete discrete wavelets with similar amplitudes defined by a 360 degree cycle between crossover positions representing a substantially zero energy level in which the radio frequency carrier has been modulated in accordance with said binary data sequence by altering the frequency to an alternative frequency determined by the spectral width of the available channel of a single or non-zero positive integer number of said complete discrete wavelets that correspond to said first binary states to derive first carrier binary signals and not altering the frequency of a single or non-zero positive integer number of said complete discrete that correspond to said second binary states of said information stream where the change of frequency from said carrier frequency waveform to said altered frequency wavelets starts at the crossover positions representing a substantially zero energy level having zero degree phase angle and ends at the crossover positions representing a substantially zero energy level having 360 degree phase angle in a spectral output of multiple frequencies spread over a broad spectral band defined by the difference in frequency between said carrier frequency waveform and said altered frequency wavelets during said altered 360 degree cycle thereby generating an integer cycle frequency modulated carrier made up of said first carrier binary signals and said second carrier binary signals such that an integer cycle frequency modulated radio frequency signal was generated and broadcasted comprising the steps of:

receiving said integer cycle frequency modulated radio frequency signal through an antenna responsive to said carrier radio frequency signal;

extracting said integer cycle frequency modulated carrier from said integer cycle frequency modulated carrier radio frequency signal received by said antenna;

demodulating said integer cycle frequency modulated carrier by detecting the respective frequencies of a single or non-zero positive integer number of said complete discrete wavelets to identify said first binary states and said second binary states that correspond with said first carrier binary signals and said second carrier binary signals; and, reconstructing said binary data sequence from said first binary states and said second binary states resulting in regeneration of said information stream.

10. The method of claim 9 wherein:

broadcasting and receiving said integer cycle frequency modulated carrier is accomplished using a Time Division Multiple Access system such that Time Division Multiple integer cycle frequency modulated radio frequency signals are broadcasted and received.

11. The method of claim 9 wherein:

broadcasting and receiving said integer cycle frequency modulated carrier is accomplished using a Frequency Division Multiple Access system such that Frequency Division Multiple integer cycle frequency modulated radio frequency signals are broadcasted and received.

12. A method for transmitting binary information from a binary information stream over a radio frequency carrier in an available channel, receiving the radio frequency carrier, and converting the transmitted binary information back into an information stream comprising the steps of:

generating a radio frequency carrier at a select carrier frequency such that said radio frequency carrier has a waveform with a continuous sequence of complete discrete wavelets with similar amplitudes;

said complete discrete wavelets being defined by a 360 degree cycle between crossover positions of said radio frequency carrier waveform;

said crossover positions representing a substantially zero energy level;

receiving said information stream as a binary data sequence of first and second binary states each having the same length;

modulating said radio frequency carrier in accordance with said binary data sequence by altering the frequency of a single or non-zero positive integer number of said complete discrete wavelets that correspond to said first binary states to derive first carrier binary signals and not altering the frequency of a single or non-zero positive integer number of said complete discrete wavelets that correspond to said second binary states of said information stream where the change of frequency from said carrier frequency waveform to said altered frequency wavelets starts at the crossover positions representing a substantially zero energy level having zero degree phase angle and ends at the crossover positions representing a substantially zero energy level having 360 degree phase angle resulting in a spectral output of multiple frequencies spread over a broad spectral band defined by the difference in frequency between said carrier frequency waveform and said altered frequency wavelets during said altered 360 degree cycle thereby generating an integer cycle frequency modulated carrier made up of said first carrier binary signals and said second carrier binary signals;

broadcasting said integer cycle frequency modulated carrier such that an integer cycle frequency modulated radio frequency signal is generated;

receiving said integer cycle frequency modulated radio frequency signal through an antenna responsive to said carrier radio frequency signal;

extracting said integer cycle frequency modulated carrier from said integer cycle frequency modulated carrier radio frequency signal received by said antenna;

demodulating said integer cycle frequency modulated carrier by detecting the respective frequencies of a single or non-zero positive integer number of said complete discrete wavelets to identify said first binary states and said second binary states that correspond with said first carrier binary signals and said second carrier binary signals; and, reconstructing said binary data sequence from said first binary states and said second binary states resulting in regeneration of said information stream made up of first binary states and second binary states each having the same length.

13. The method of claim 12 wherein:

the modulating of said radio frequency carrier is carried out by altering the frequency of said complete discrete wavelets while minimizing sideband distortions of said radio frequency carrier.

14. The method of claim 12 wherein:

the generation of said radio frequency carrier is accomplished by a local oscillator having an oscillator output at a select carrier frequency.

15. The method of claim 12 comprising the additional step of:

reducing of harmonics from said integer cycle frequency modulated carrier by filtering said integer cycle frequency modulated carrier.

16. The method of claim 12 wherein:

broadcasting and receiving said integer cycle frequency modulated carrier is accomplished using a Time Division Multiple Access system such that Time Division Multiple integer cycle frequency modulated radio frequency signals are broadcasted and received.

17. The method of claim 12 wherein:

broadcasting and receiving said integer cycle frequency modulated carrier is accomplished using a Frequency Division Multiple Access system such that Frequency Division Multiple integer cycle frequency modulated radio frequency signals are broadcasted and received.

* * * * *